United States Patent

[11] 3,592,458

[72] Inventor George W. Jackson
 Dayton, Ohio
[21] Appl. No. 827,427
[22] Filed May 23, 1969
[45] Patented July 13, 1971
[73] Assignee General Motors Corporation
 Detroit, Mich.

[54] EXHAUST AND RELIEF VALVE ASSEMBLY
 8 Claims, 11 Drawing Figs.
[52] U.S. Cl. .................................................. 263/65
[51] Int. Cl. .................................................. F16f 5/00
[50] Field of Search .......................................... 267/65,
 650; 188/88.1

[56] References Cited
 UNITED STATES PATENTS
2,879,795 3/1959 Rossman ..................... 263/65 (D)

FOREIGN PATENTS
1,207,806 12/1965 Germany ..................... 267/65 (D)

Primary Examiner—James B. Marbert
Attorneys—W. E. Finken and J. C. Evans

ABSTRACT: In a preferred form, a valve assembly including an inlet and an outlet. The valve includes an oscillatable, damped shaft and a cam operator member coupled thereto by unidirectional clutch means that couple the sleeve and shaft for concurrent movement in a first direction and decouples the sleeve with respect to the shaft on movement of the sleeve in a second direction. In a first control position, the cam operator conditions a valving element to an open position so as to communicate the inlet and outlet. In a second control position, the cam operator is positioned to maintain the valve closed. Further, in the second position, the valve includes means responsive to a predetermined pressure at the inlet to open the valving element independently of the cam operator so as to relieve the pressure buildup by communicating the inlet with the exhaust.

PATENTED JUL 13 1971

INVENTOR.
George W. Jackson
BY
J. C. Evans
ATTORNEY

INVENTOR.
George W. Jackson
BY
J.C. Evans
ATTORNEY

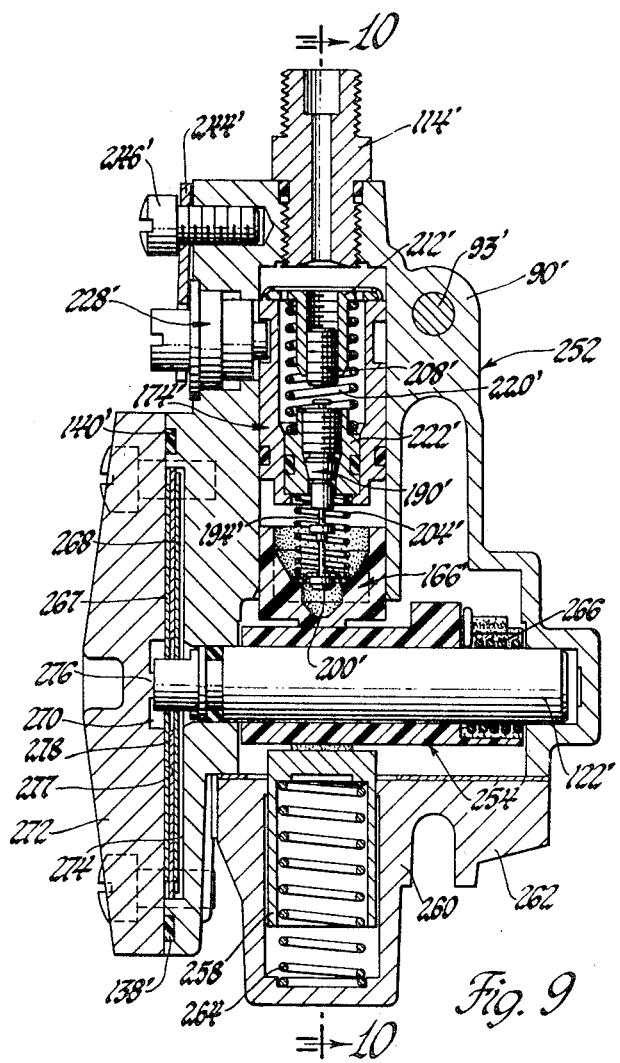
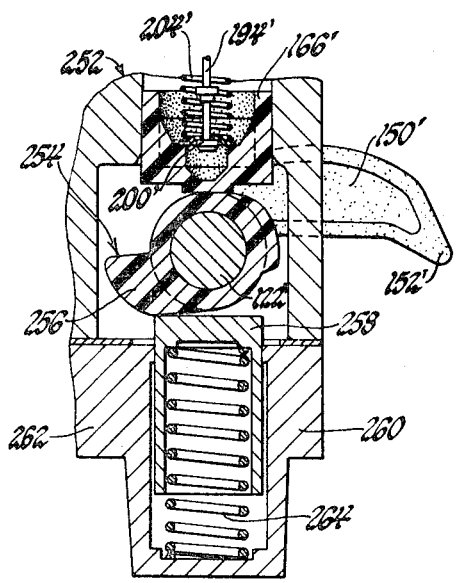
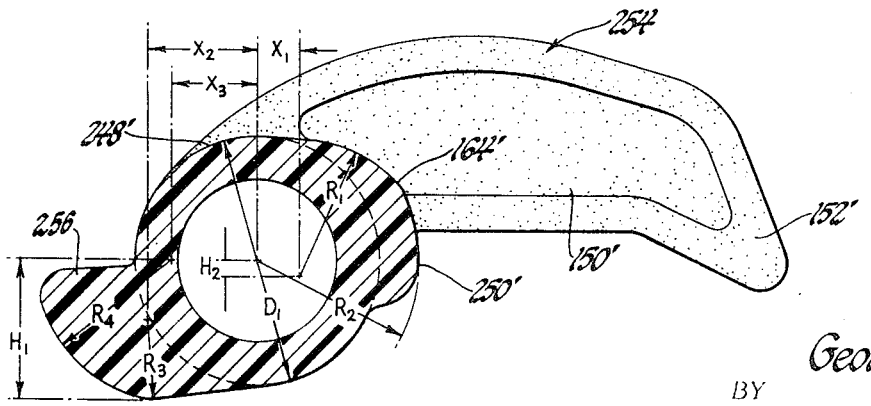
Fig. 9
Fig. 10
Fig. 11
INVENTOR.
George W. Jackson
BY
J.C. Evans
ATTORNEY

EXHAUST AND RELIEF VALVE ASSEMBLY

This invention relates to mechanically operated valve mechanisms and more particularly to a mechanically operated valve that controls fluid flow between an inlet and outlet in response to mechanical movement of an operating member and further in response to a predetermined pressure buildup at the inlet of the valve independent of positioning of the operating member.

One type of leveling system for maintaining a predetermined height relationship between the sprung and unsprung mass of the vehicle includes an electric-motor-driven compressor that when energized will direct high-pressure air into the control chamber of a pressurizable fluid spring component to support added vehicle load that would otherwise deflect primary spring components of the vehicle suspension thereby to move the vehicle chassis below a desired predetermined level height relationship with respect to its ground-engaging suspension systems.

In order to control such a system, it has been proposed that when the vehicle chassis moves about the desired height relationship that a height controller be included to dump high-pressure air from the spring components to return the vehicle to a level position. ignited the height controller is located on the fluid spring component as part of the fluid spring assembly to reduce the number of external fluid connections and to simplify installation of the fluid spring component and valving unit on a vehicle for use in an automatic leveling system.

The exhaust of high-pressure fluid from the springs following energization of the electric-motor-driven compressor is sensed by means that will terminate energization of the motor compressor. To initiate a further leveling of the vehicle, it is necessary to close a mechanically operated start switch mounted on the dashboard of the vehicle.

One problem with leveling systems of the aforementioned type is that the electric motor, under conditions where the compressor is unable to produce a fluid spring pressure to compensate for the deflection in the primary springs of the suspension system, remains energized to constitute a continual drain on the vehicle battery during vehicle operation.

One object of the present invention, therefore, is to provide a height controller for association with an automatic leveling system of the type that includes an electrically motor driven compressor that is deenergized by means responsive to exhaust of fluid from the fluid springs following return of the vehicle chassis to a point slightly above level, including; a single valve that serves the combined function of fluid spring exhaust when the vehicle is in its over level position following electric motor energization and of fluid spring relief when a maximum pressure buildup occurs in the fluid springs and the vehicle is below level following a pump-up phase of electric motor energization because the vehicle loading is greater than the uplifting corrective capacity of the fluid springs.

A further object of the present invention is to provide a combination height sensing controller assembly having a valving component therein with a fill position and an exhaust position and wherein the valve is associated with means for operating it to the exhaust position on either the occurrence of a predetermined height relationship between the sprung and unsprung mass of a vehicle and/or a predetermined maximum pressure buildup within a fluid spring component of a vehicle-leveling system.

Another object of the present invention is to provide a height controller for an automatic leveling system of the type having an electrically motor driven compressor selectively energized to vary the pressure in a fluid spring that assists a primary spring component of a vehicle suspension and wherein the height controller includes a damped operated shaft having a sleeve slidably rotated and supported thereon that is coupled to the shaft on movement of the sleeve in a first direction of rotation and decoupled from the shaft in an opposite direction of rotation so as to cause an associated valve mechanism of the controller to be damped against normal road movement oscillations between the sprung and the unsprung mass of a vehicle and to close without delay when additional static loading is placed on the vehicle.

Another object of this invention is to provide a mechanically operated height controller that is adapted to be connected directly to a wall portion of a fluid spring in a vehicle leveling system and wherein the height controller includes means for exhausting fluid from the spring either following leveling of the vehicle or when the fluid spring component has a predetermined maximum pressure building therein; the height controller including a single valve and means to operate the valve so as to be damped against ordinary road movements of the vehicle and to be closed without delay when static loading is added to the vehicle.

In one working embodiment of the present invention, the aforesaid objects and others are attained by including a controller housing with an inlet and outlet. An oscillatable operating shaft within the controller has one end thereof connected to a motion damper. A sleeve is slidably rotatably supported on the operating shaft and is directly coupled thereto by a spring clutch when the sleeve is oscillated relative to the shaft in a first direction. In the opposite direction of relative movement between the sleeve and the shaft the spring is unwound to decouple the sleeve from the damper.

The controller includes a bore therethrough which has a valve located therein on a movable carriage. The valve has an elongated stem which connects to a spring-biased cam follower that is reciprocated within the bore by a cam ramp on the sleeve. The sleeve also has an outwardly directed finger that is held by spring means against a part of the fluid spring that is relatively movable with respect to that portion of the fluid spring on which the controller housing is located. When the finger is in a first operating position, that represents a height relationship between the component parts of the fluid springs corresponding to the sprung mass of the vehicle being below level, the valve is closed to prevent exhaust of fluid from the fluid spring. When the vehicle sprung mass is moved or located above level by virtue of a change in the static loading thereon the cam ramp and follower will be positioned to cause the valve to open and exhaust the fluid springs to level the vehicle.

When the vehicle spring mass is too heavily loaded and is located below a predetermined level point to produce a maximum pressure buildup in the fluid spring components a movable piston that carries the valve is shifted to cause a second end portion on the operating stem of the valve to engage a valve operator and thereby cause the valve to be conditioned to open and exhaust the fluid spring to relieve the pressure buildup therein caused by the overload condition.

Further objects and advantages of the present invention will be apparent from the following description, reference being had to the accompanying drawings wherein preferred embodiments of the present invention are clearly shown.

FIG. 9 is an enlarged fragmentary sectional view of another embodiment of the height controller of the present invention;

FIG. 10 is a vertical sectional view taken along the line 10-10 of FIG. 9 looking in the direction of the arrows; and, FIG. 11 is an enlarged vertical sectional view of an operator cam in the embodiment of FIGS. 9 and 10.

Figure 1:
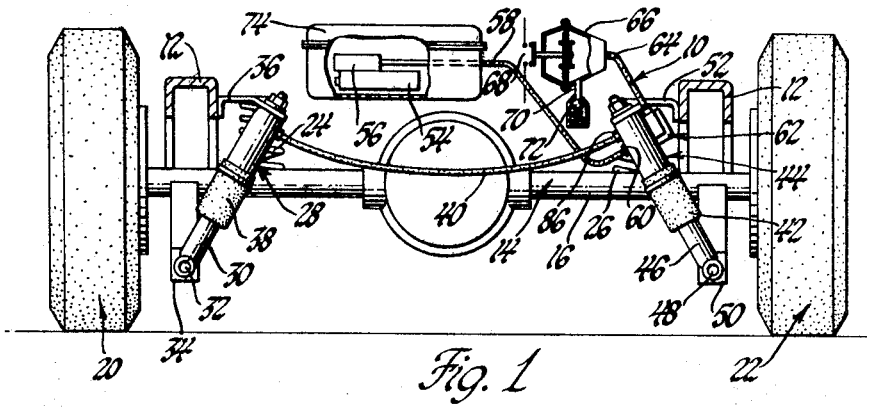
FIG. 1 is diagrammatically shown in view of a vehicle having a leveling system that includes the height controller of the present invention.

Referring now to the drawings, in FIG. 1 a pump-up-type open loop, semiautomatic leveling system 10 is illustrated in association with a vehicle having a chassis with a lower frame 12. In the illustrated arrangement, the lower frame 12 is associated with a rear suspension assembly 14 having an axial housing 16. On the opposite ends of the housing 16 are tire and wheel assemblies 20, 22.

The rear suspension assembly 14 constitutes an unsprung mass of the vehicle on which is supported the lower frame 12 which constitutes a sprung mass of the vehicle.

More particularly, in the illustrated arrangement a primary suspension spring 24 resiliently supports one side of the frame 12 from the assembly 14 and on the opposite side thereof a primary suspension spring 26 performs the same function.

Associated with the spring 24 is an auxiliary load supporting device 28 that includes a hydraulic shock absorber 30 having its bottom end mount connected by a pin 32 to a control arm 34.

The upper end of the shock absorber 30 is connected to a bracket 36 off the frame 12.

A pressurizable fluid spring 38 of the assembly 28 is pressurized through a crossover tube 40 that communicates with the control chamber of a fluid spring 42 of an auxiliary load supporting device 44 that also includes a hydraulic shock absorber 46.

The shock absorber 46 has its bottom end mount connected by a pin 48 to a control arm 50. The upper end of the shock absorber 46 is secured to a bracket 52 that is fixedly secured to the side of the lower frame 12 opposite bracket 36.

In the illustrated arrangement, an electric motor 54 drives a compressor 56 which has an inlet connected to atmosphere and an outlet connected through a high-pressure supply conduit 58 to an inlet fitting 60 to the control chamber of fluid spring 42.

On the side of the fluid spring 42 there is located a controller 62 that is selectively operated, in accordance with principles of the present invention, to control the exhaust of fluid from both the fluid spring 38 and fluid spring 42 to an exhaust conduit 64 that communicates with a pressure operator 66 that operates a control switch 68 for controlling energization of the motor 54. When fluid is dumped to the pressure operator 66, the motor is off.

An outlet 70 from the pressure operator 66 includes a spring biased ball check valve element 72 that serves as a primary dump path for fluid from the assemblies 28, 44 during an exhaust phase of operation.

In the illustrated arrangement, the motor and compressor are located within a canister 74 to protect them against damage. The details of the aforedescribed semiautomatic leveling system 10 are merely representative of one arrangement that is improved by use of the height controller of the present invention.

Figure 2:
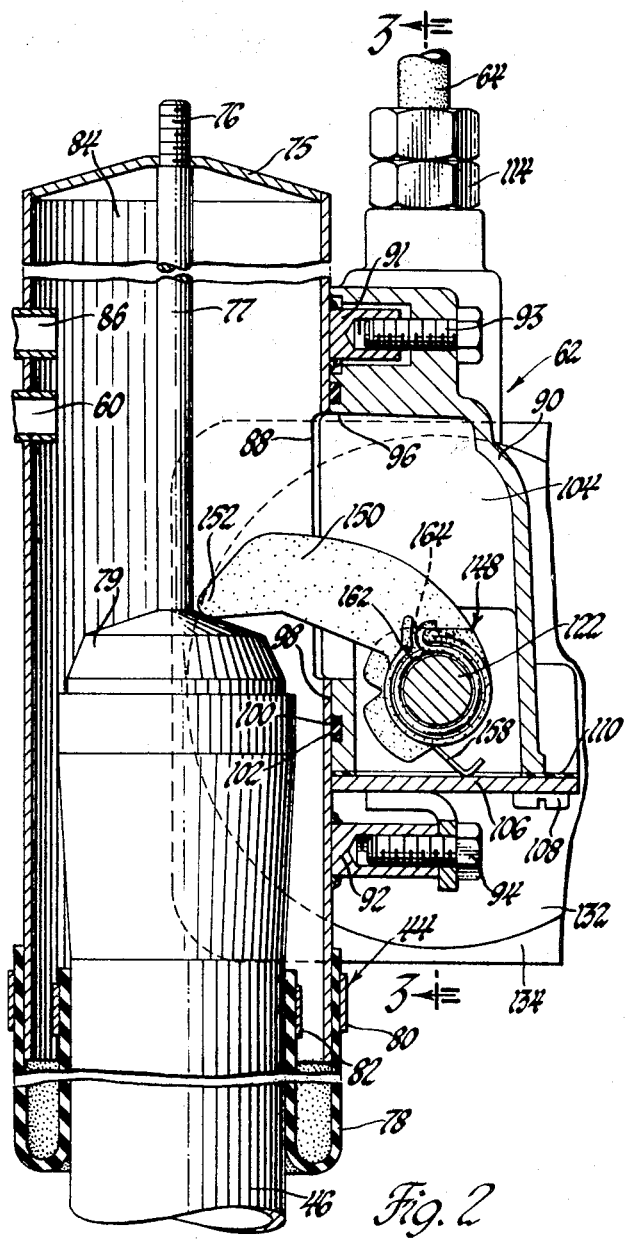
FIG. 2 is an enlarged, fragmentary, sectional view of the controller in association with a combination shock absorber and air spring device.

Referring now more particularly to FIG. 2, the auxiliary load support device 44 is seen to include a rigid outer wall or dust shield 75 at the upper end thereof which connects to a threaded stud 76 that is fixedly secured to the bracket 52. The dust shield 70 also connects to the upper end of a piston rod 77 which extends from the top 79 of the shock absorber 46.

The dust shield 75 has its lower end fixedly connected to one end of a flexible sleeve element 78 by a clamp ring 80 defining a sealed joint. The sleeve 78 is turned inwardly on itself and has the opposite end thereof located against the outer circumferential surface of the shock absorber 46 where it is secured by a clamp ring 82 to define another sealed joint. Accordingly, the dust shield 75 and flexible sleeve element 78 along with the shock absorber 46 define a pressurizable control chamber 84 that is communicated with the high-pressure supply conduit 58 by the inlet fitting 60 and also is communicated through an outlet fitting 86 with crossover tube 40 to a like fitting on the dust shield portion of the combination shock absorber and air spring assembly 28. Assembly 28 has component parts identical to those described above with reference to assembly 44. The only difference between the assembly 44 and the assembly 28 is the kinds of fluid fittings thereon that are clearly shown in FIG. 1.

Back to FIG. 2, it can be seen that the dust shield 70 includes a side port 88 therein that defines an outlet from the control chamber 84 of assembly 44 and also a path for exhaust of fluid from assembly 28 through the crossover tube 40.

The controller 62 includes an outer housing 90 that is fixedly secured to spaced apart nuts 91 and 92 that are welded to the outer surface of the dust shield 75. The nuts 91, 92 receive screws 93, 94 respectively for fastening the housing 90 in place on the dust shield 75.

The housing 90 further includes a side opening 96 which is aligned with the side port 88. The opening 96 is formed in a curved surface 98 on the housing 90 which is juxtapositioned with respect to the outer surface of the dust shield 75 and a continuously formed groove 100 in the surface 98 has an annular seal element 102 therein maintained in sealing engagement with the dust shield to prevent fluid leakage from the control chamber 84.

The side opening 96 leads to a chamber 104 having a bottom closure element 106 at the base thereof secured to the housing 90 by fastening screws 108 which hold a gasket 110 between the closure element 106 and the housing 90 to define a sealed fluid flow path to a housing bore 112 which communicates with an exhaust fitting 114 threadably received and supported within an upper end opening 116 in the housing 90. The fitting 114 is sealed with respect to housing 90 by an O-ring seal element 118 supported within a groove 120 in the end opening 116.

Figure 3:
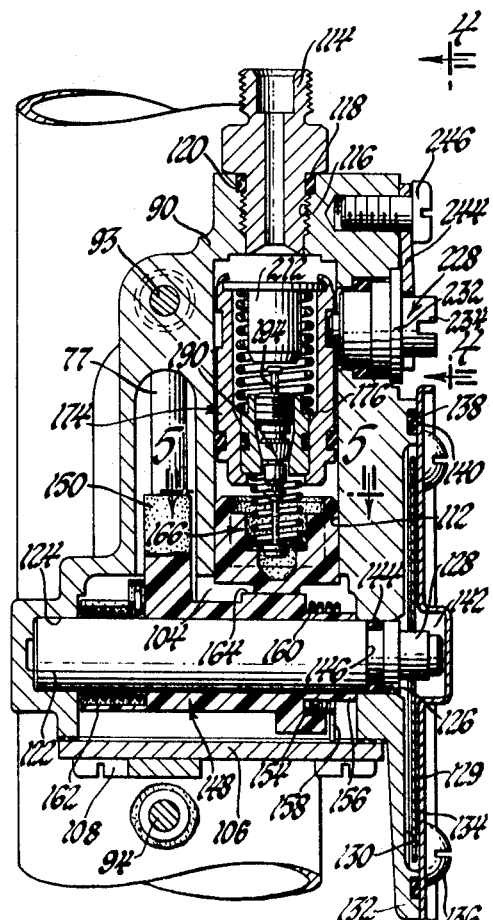
FIG. 3 is a vertical sectional view taken along the line 3–3 of FIG. 2 looking in the direction of the arrows.

Oscillatable operating shaft 122 is located in a lower part of the chamber 104 as is best seen in FIG. 3. One end of the operating shaft 122 is rotatably supported in a bearing 124 on the housing 90 and the opposite end thereof is directed through an opening 126 in the housing 90 at which point it is rotatably supported by housing 90. The shaft 122 includes an outwardly directed extension 128 thereon which is connected to a generally circular damping disc 129 that overlies substantially the full planar extent of a depression 130 that is formed in a side plate 132 of the housing 90. The depression 130 in the plate 132 is closed by a cover 134 which is secured on the housing 90 by suitable fasteners such as screws 136 located about the outer periphery thereof.

A seal element 138 is located in an annular groove 140 formed continuously around the outer periphery of the plate 132 and it is held in sealing engagement with the cover 134 to define a chamber 142 filled with a suitable viscous damping fluid. The fluid also fills depression 130 and thereby covers each face of the disc 129 so that movement of the disc within the chamber 142 will produce a shear force resistance between the disc and the cover 134 and/or the plate 132 thereby to damp relative oscillations of the operating shaft 122 about its longitudinal axis.

In the illustrated arrangement, the chamber 142 is sealed along the periphery of the shaft 122 by an O-ring seal element 144 that is located within a peripheral groove 146 formed continuously around the operating shaft 122 where it passes through the opening 126 in the housing 90.

A sleeve member 148 is slidably rotatably received on the operating shaft 122 between the bearing 124 and the opening 126 in the housing 90. The sleeve member 148 includes a radially outwardly directed finger 150 that is located within the chamber 104 so as to be moved with respect to and through the side opening 96 of the housing 90 and the side port 88 in the dust shield 75. An angularly offset distal end 152 on the finger 150 is located within the control chamber 84 so as to overlie the top 79 of the shock absorber 46.

The finger 150 is biased in a counterclockwise direction as viewed in FIG. 1 by a coil spring 154 that is wound around a sleeve extension 156 that is located on the member 148 adjacent the opening 126 in the housing 90. The coil spring 154 includes an end segment 158 thereon that engages the bottom closure element 106 and an end segment 160 that is seated against the cam member 148.

The opposite end of the member 148 is coupled to the operating shaft 122 through a spring clutch element 162 which serves to directly couple the member 148 to the operating shaft 122 when the member 148 is driven in a counterclockwise direction relative to the operating shaft 122 as is viewed in FIG. 2.

In the opposite direction of rotation, clockwise as viewed in FIG. 2, the spring clutch 162 is unwound from the outer periphery of the operating shaft 122 whereby the element 148 is decoupled from the damped shaft 122 so as to allow undamped movement of the finger 150 into the chamber 104 as viewed in FIG. 2.

Between the finger 150 and the extension 156, the element 148 has a raised peripheral cam ramp 164 that increases in height in a counterclockwise direction as viewed in FIG. 2.

Figure 5:
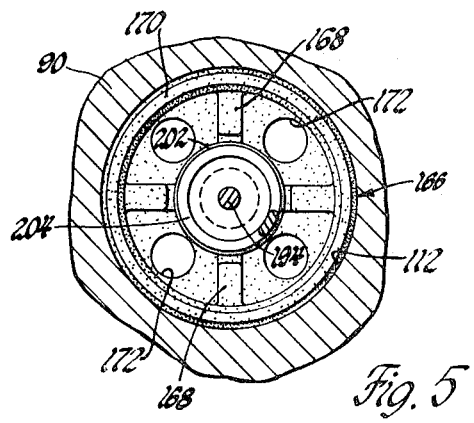
FIG. 5 is a horizontal sectional view taken along the lines 5–5 of FIG. 3 looking in the direction of the arrows.

The ramp 164 engages a cam follower 166 that is slidably reciprocably received within the housing bore 112. The cam follower 166 is more specifically set forth in FIG. 5 as including a plurality of circumferentially located ribs 168 that serve to reinforce a continuously formed outer peripheral wall 170 that slides against the inside of the bore 112. Between each of the reinforcing ribs 168 is located a passageway or opening 172 that serves to communicate the chamber 104 with the bore 112 at a point above follower 116 so as to define an exhaust path to a combination height control and relief valve assembly 174.

The assembly 174 includes a cylindrical carriage member 176 that is slidably adjustably received within the bore 112 above the cam follower 166.

The carriage 176 includes a bottom opening 178 which is defined by a radially inwardly directed continuously formed flange seat 180. The flange seat 180 supports the lower end of a movable piston element 182 which is slidably reciprocably received within a bore 184 in the carriage 176 immediately above the bottom opening 178 therein.

The piston 182 includes a peripheral groove formed continuously therearound at 186 in which is located an O-ring element 188 for sealing against leakage between the piston 182 and the carriage at bore 184.

A Schrader type valve 190 carried by the piston 182 includes a threaded core 192 that secures the valve 190 in place within an internally threaded head portion of the piston 182.

The valve 190 includes an operating stem 194 that has a valving element 196 fixedly secured thereto normally spring biased by a return spring inside core 192 (not shown) against a valve seat 198 on the base of the core portion of the valve 190.

A stop member 200 on the bottom end of the operating stem 194 supportingly receives a washer element 202 that is freely slidable with respect to the portion of the operating stem depending below the valving element 196. A coil spring 204 biases the washer 202 seated against the member 200.

The opposite or upper end of the operating shaft 194 includes a head portion 206 which is normally maintained in spaced relationship to the underside of a setscrew 208 that is threadably received within a threaded interior 210 of a plug 212 that includes a radially outwardly directed flange 214 on the upper end thereof seated on a continuously formed upwardly facing shoulder 216 on the upper end of the movable carriage 174.

The flange 214 of the plug 212 is fixedly secured with respect to the carriage 176 by a spun-over upwardly directed flange 218 on the carriage 176. Openings 219 in flange 214 communicate the carriage interior with outlet 114.

The flange 214 also serves as a seat for one end of an adjustment or relief pressure spring 220 that has the opposite end thereof supportingly received on an upper seat 222 on the piston member 182.

Figure 6:
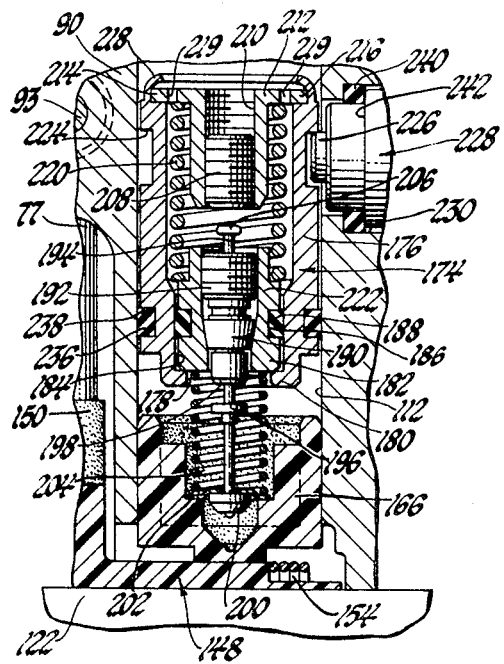
FIG. 6 is a vertical sectional view like FIG. 3 showing the valve in its open position.

The carriage 176 includes a peripheral groove 224 around the upper end thereof slightly below the flange 218 in which is received an eccentrically located tip 226 on an adjusting plug member 228 that extends through a side opening 230 in the housing 90 as is best seen in FIGS. 3 and 6. The plug member 228 has a flange 232 thereon located outwardly of the opening 230 serving as a stop against axial movement of the plug member 228 into the bore 112. A slotted head 234 on the plug member 228 is adapted to receive a tool for rotating it so as to shift the eccentrically located tip 226 upwardly and downwardly within the bore 112 thereby to cause a like movement of the carriage 176. The carriage 176 is slidably sealed within the bore 112 by an O-ring 236 that is seated in an annular groove 238 in the periphery of the carriage 176 adjacent the bottom flange 180 thereof.

Leakage from the bore 112 around the outer periphery of the adjusting plug 228 is sealed by an O-ring element 240 that is seated within the opening 230 against a shoulder 242 on the plug 228 located immediately axially inwardly of the flange 232.

Figure 4:
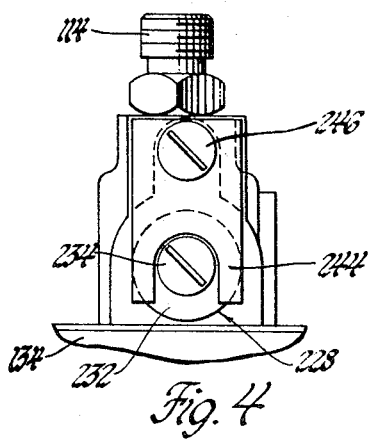
FIG. 4 is a fragmentary side elevational view looking in the direction of the arrows 4 in FIG. 3.

As best seen in FIG. 4, the plug 228 is held in its adjusted position by a bifurcate spring 244 that overlies the flange 232 to be held in interlocking relationship therewith by a setscrew 246 having the head thereof against the outside surface of the element 246 and the shank thereof threadably received in a tapped opening at the top of the housing 90.

In the illustrated semiautomatic leveling system the aforedescribed controller 62 produces a predetermined buildup of pressure in the auxiliary load supporting devices 28, 44 which reflects either of two conditions.

The first condition is when a load has been added to the chassis 12 and electrical circuit means are conditioned to energize the motor 54 to drive the compressor 56 so as to discharge high-pressure air through the high-pressure discharge conduit 58 into the pressurizable control chambers 84 of the assemblies 28, 44. When the added vehicle load is below a predetermined maximum value, the devices 28, 44 produce a supplemental resultant uplifting force on the lower frame 12 that assists springs 24, 26 so as to move the frame 12 above a predetermined height relationship with respect to the rear suspension assembly 14. With the movement of the lower frame 12 above the desired predetermined height relationship the finger 150 is moved interiorly of the control chamber 84 and counterclockwise about the longitudinal axis of shaft 122 as viewed in FIG. 2 to a point where a reduced height segment of the variable height cam ramp 164 engages the cam follower 166. The spring 204 biases the follower 166 in a direction to move it and the washer 202 along with the operating stem 194 downwardly within the bore 112 so as to move the valving element 196 away from the seat 198 thereby to open the valve as shown in FIG. 6.

As a result, a slight amount of high-pressure air is exhausted from the control chamber 84 through the chamber 104 thence through the openings 172 in the cam follower 166, the interior of the valve 174 thence through openings 219 in the flanged head 214 into the top of the bore 112 from whence the pressurized fluid flows through the fitting 114 into the exhaust conduit 64 thence to the pressure operator 66.

At this point, the switch 68 will be opened in the representatively illustrated leveling system to open a circuit for energizing the motor 54. As a result, the compressor 56 is shut down and a predetermined bleed from fluid springs 38, 42 through outlet 70 occurs until the lower frame 12 of the chassis returns to its desired predetermined height relationship with respect to the rear suspension assembly 14.

The return of the component parts of the vehicle to the desired height relationship is reflected in the position of the finger 150 on the cam element 148 with respect to the operating shaft 122, this position being that shown in solid lines in FIG. 2. During clockwise movement of element 148 the spring clutch 162 is unwound from the periphery of the shaft 122, hence following exhaust, return movement of the element 148 is immediate and without damping.

In another phase of operation, the controller 62 includes means to relieve the leveling system 10 under conditions where the added vehicle load exceeds a maximum predetermined point.

Under these conditions the primary suspension springs 24, 26 along with the auxiliary load supporting assemblies 28, 44 are unable to return the vehicle chassis to a desired predetermined height relationship with respect to the rear suspension assembly 14.

Figure 7:
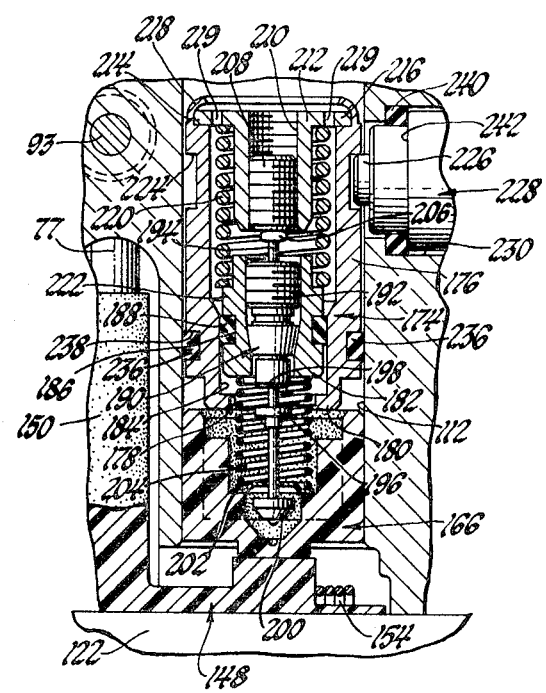
FIG. 7 is a view in vertical section like FIG. 3 showing the valve of the controller in a high-pressure relief position.

Thus, the assemblies 28, 44 remain relatively collapsed and as a result the finger 150 of the element 148 tends to be rotated interiorly of the chamber 104. This causes the cam ramp 164 to have an increased height segment thereof in engagement with the cam follower 166 to cause it to move upwardly within the bore 112 and thereby move the washer 202 upwardly so as to compress the spring 204 as shown in FIG. 7. An increase in pressure within the control chambers 84 produced by operation of the compressor 56 as well as the force of the spring 204 acts on the underside of the piston 182 to cause it to be moved upwardly against the relief pressure spring 220. This will move the valve 190 upwardly within the carriage 176 until the head 206 on the operating stem 194 engages the adjustably located setscrew 208 within the plug 212. As a result, the valving element 196 is moved away from the seat 198 whereby excessive pressure buildup in the control chambers 84 is exhausted through a fluid path identical to that described with respect to the exhaust operation which occurs following movement of the vehicle chassis above the desired predetermined height relationship.

In accordance with other principles of the present invention, once the vehicle is leveled the damped operating shaft 122 will damp movement of the cam element 148 against high frequency load produced relative movements between the dust shield 75 and the shock absorber 46 of the assembly 44. Accordingly, the valve assembly 190 remains closed during such movement thereby to prevent an undesirable exhaust of fluid from the control chamber 84 other than during periods where the vehicle is either overloaded or is moved above level in order to terminate motor energization as discussed above.

More particularly, assuming that the vehicle has returned to level, the cam element 148 will be located as shown in FIGS. 2 and 3 to locate a height segment of the cam ramp 164 with respect to the cam follower 166 which will locate the operating stem 194 so as to maintain the valving element 196 in sealing engagement with the seat 198.

Transitory road induced vehicle movements that cause the opposite ends of the assembly 44 to move so as to cause top 79 of the shock absorber 46 to move away from the dust shield 75 do not affect valve operation. MOre particularly, when the top 79 is moved away from the distal end 152 a following movement of finger 150 will be delayed, since during counterclockwise movement, the element 148 is coupled to the damped operating shaft 122. Since the element 148 is directly coupled to the operating shaft 122 the relative movement of the disc 128 within the fluid-filled chamber 142 will keep the cam element 148 in the illustrated solid line position of FIG. 2.

Transistory movements of the sprung and unsprung masses of the vehicle that cause the top 79 of the shock absorber 46 to move upwardly within the dust shield 75 will momentarily shift the finger 150 into the chamber 104 to shift the cam ramp 164 so as to move the cam follower 166 upwardly within the chamber 112. The valve 174 is decoupled from the follower 166 during this movement and since there is no excessive pressure buildup in the control chamber 84 during this phase of operation, the valve 174 will remain closed to keep the control chambers 84 of the assemblies 28, 44 inflated to a desired predetermined point.

Figure 8:
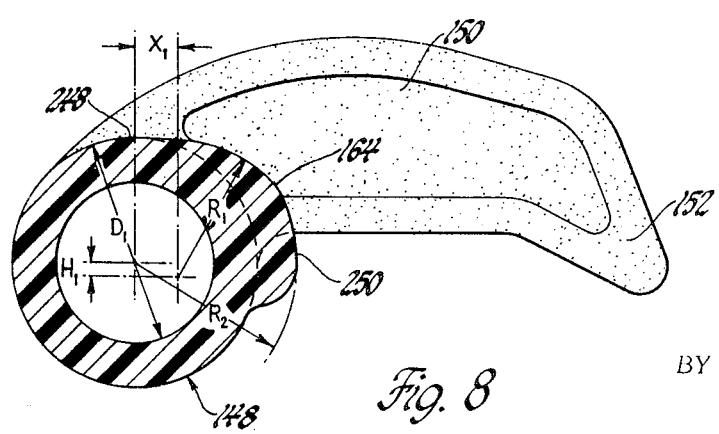
FIG. 8 is an enlarged vertical sectional view of an operator cam in the controller of FIGS. 1—7.

In order to attain the aforementioned type of control during travel of the sprung mass above the predetermined height relationship, relief valve action when the system is overloaded, and damping action of transitory road induced movements, the cam ramp 164 has a configuration as is illustrated in FIG. 8.

The shallow depth segment of the cam profile is indicated by reference numeral 248 and the deep depth segment of the cam profile is indicated by reference numeral 250.

The significant characteristics of the cam profile, in one working embodiment of the invention that produces the aforementioned type of operation, is as set forth in the following schedule:

CAM PROFILE—FIGURE 8

|  | Inches |
|---|---|
| $D_1$ | .562 |
| $R_1$ | .312 |
| $R_2$ | .381 |
| $X_1$ | .100 |
| $H_1$ | .031 |

In the associated system the mechanical and electrical components have the following rating:

| Component | Rating |
|---|---|
| Compressor 56 | .136 cu. in. displacement. |
| Motor 54 | 5 amps at 12 volts. |
| Operating pressure of assemblies 28, 44 | 10–125 p.s.i.g. |

Another embodiment of the invention is illustrated in FIGS. 9 through 11 as a controller 252; component parts of the controller 252 that are identical to those illustrated in the controller 62 are designated with like reference numerals primed.

The difference between the controller 252 and controller 62 is the manner in which the operating shaft 122' thereof is damped and the manner in which a cam element 254 thereof is biased in a direction to couple it to the operating shaft 122'.

More particularly, as seen in FIG. 9, the cam element 254 includes an ear formation 256 thereon which is in engagement with the top of an inverted hollow, open-ended piston element 258 that is slidably reciprocably received within a depending cylindrical extension 260 on a modified base 262 that is secured to the housing 90' by suitable fastening means (not shown).

The piston 258 is biased outwardly of the cylinder 260 by a coil spring 264 that serves the function of the torsion spring 156 in the first embodiment. The spring 264 thus biases the piston 258 against the ear 256 of the cam element 254 so as to cause it to rotate in a direction wherein a clutch spring 266 will wind tightly on the end of the operating shaft 122' whereby the cam element 254 and operating shaft 122' will be damped by means including two discs 266, 268, each fixedly secured to the end of the operating shaft 122' located within a slightly modified damping chamber 270 formed between a disc cover 272 and a recessed opening 274 in the housing 90'.

As was the case in the first embodiment the chamber 270 is sealed by a peripheral seal element 138' located in a peripheral groove 140' in the housing 90'. The cover 272 includes a central axially inwardly extending segment 276 which seats against the end of shaft 122' within the chamber 270. This maintains a spaced relationship between the interior surface 278 of the cover 272 and the disc 266. It also locates the disc 268 with respect to the inside surface of chamber 270 formed by the recessed opening 274 in housing 90'.

Between discs 266, 268 is located a spacer 278. A viscous damping fluid such as a silicone fluid having a viscosity of 100,000 centistokes is sheared between the surfaces of the discs 266, 268, spacer 278 and the walls of chamber 270 to damp movement of the cam element 254 with respect to the shaft 122' when the device is operated in accordance with the present invention.

The operation of the device is identical to that described with respect to the controller 62 in the first embodiment. The damping is produced by a modified arrangement of parts and the biasing of the cam element 254 so as to cause the finger 150' in this embodiment to move against the top surface of a shock absorber unit as previously described is modified in the form of the biased piston 258 and the extension or ear segment 256 on the cam element 254.

In this embodiment of the invention, the cam profile is as illustrated in FIG. 11 and includes the characteristics in the following schedule:

CAM PROFILE—FIGURE 11

| | Inches |
|---|---|
| $X_1$ | .102 |
| $X_2$ | .267 |
| $X_3$ | .203 |
| $H_1$ | .328 |
| $H_2$ | .031 |
| $R_1$ | .312 |
| $R_2$ | .381 |
| $R_3$ | .187 |
| $R_4$ | .342 |
| $D_1$ | .562 |

The mechanical and electrical components of the representatively illustrated leveling system referred to in the first embodiment also are found in systems used with the controller 252 described in FIGS. 8 through 11. Their characteristics are the same as those referred to with reference to the controller of the first embodiment.

While the embodiments of the invention as herein disclosed constitute preferred forms, it is to be understood that other forms might be adopted.

What I claim is:

1. A height controller for controlling pressurization in a fluid spring component of an automatic leveling system for a vehicle having a sprung and an unsprung mass comprising; a housing having an inlet adapted to be connected to the control chamber of a fluid spring component, an outlet adapted to be connected to a low-pressure point in the system, valve means within said housing including a valve seat and a valve closure element normally closed on said seat, an oscillatable member, spring means for biasing said oscillatable member to follow movement of one of the vehicle masses to detect relative movement therebetween, means to open the valve when the oscillatable member is positioned to indicate a predetermined raised height relationship between the sprung and unsprung masses for exhaust fluid flow from the fluid spring through said inlet and said outlet to the low-pressure point of the system, and means independent of said first means for opening said valve at a predetermined depressed height relationship between the sprung and unsprung masses that causes a predetermined maximum pressure within the fluid spring component thereby to allow relief fluid flow from the fluid spring component through said inlet and outlet ports of said housing.

2. A height controller for regulating pressure in a pressurized spring component in a leveling system for maintaining a desired height relationship between the sprung mass of a vehicle comprising; a housing having an inlet adapted to be in communication with a fluid spring component of a leveling system, an outlet in said housing adapted to be connected to a low-pressure point in a leveling system, a housing bore fluidly communicating said inlet and said outlet, a valve located within said bore, means for supporting said valve for sliding movement relative to said bore including a piston member having an end surface thereon exposed to the pressure at the inlet port, a relief pressure spring biasing said piston in a first predetermined direction within said housing bore against the pressure acting on said exposed end surface, a shaft, damping means connected to said shaft for producing a predetermined resistance to movement of said shaft about its longitudinal axis, a sleeve member slidably received over said shaft, coupling means for connecting said sleeve member for concurrent damped movement with said shaft upon a first predetermined limited rotary movement thereof, said coupling means allowing free relative rotation between said sleeve and said shaft upon movement of said sleeve in an opposite direction of rotary movement with respect to said shaft, first valve operator means responsive to damped movement of said sleeve in a damped direction to condition said valve when the vehicle is leveled to open communication between said inlet and outlet for exhausting fluid from the fluid spring component, and second valve operator means including an abutment member fixedly secured within said bore engageable with said valve to open said valve when a predetermined pressure buildup occurs on the exposed end surface of said piston and the sprung mass of the vehicle is below a desired predetermined height relationship with the unsprung mass to allow relief flow of fluid from the fluid spring component through said inlet and outlet.

3. A combination exhaust and relief valve assembly for controlling pressure within a fluid spring of an automatic leveling system to produce a predetermined height relationship between the sprung and unsprung mass of the vehicle comprising; a valve housing having an inlet port adapted to be connected to the pressure control chamber of a fluid spring component, an outlet port in said housing adapted to be connected to a low-pressure point in the leveling system, a bore in said housing fluidly communicating said intake port with said outlet port, a valve located within said housing bore including an elongated operating stem arranged coaxially of the longitudinal axis of said bore, a piston connected to said valve, means for slidably supporting said piston within said housing bore for relative reciprocal movement with respect thereto, a first valve operator located for relative movement with respect to one end of said housing bore, means for moving said first valve operator within said bore in response to relative movements between the sprung and unsprung masses of the vehicle, a second valve operator fixedly located within said housing bore at the opposite end thereof, a first spring connected between said first valve operator and said piston to produce a first resultant force on said piston causing it to move toward said fixed operator, a second spring in the opposite end of said housing engaging said piston and producing a greater resultant force on said piston than that of said first spring to prevent operation of said valve by said second operator during normal valving operation, said first valve operator being movable exteriorly of said housing bore during an exhaust phase of operation and operative to engage said stem to lift said closure element from said seat to cause flow through said valve and exteriorly of said outlet port, means for damping relative movement between said first valve operator and said housing bore when the vehicle masses have a predetermined height relationship, said piston and valve being movable against said second spring upon the occurrence of a predetermined maximum pressure in the fluid spring to cause said stem to engage said second operator to lift said closure element from said seat to relieve a predetermined maximum pressure buildup in the fluid spring when the sprung mass is located below a predetermined height relationship with said unsprung mass.

4. A height controller for controlling fluid flow between a high-pressure source and a low-pressure source in a system for leveling the sprung and unsprung mass of a vehicle comprising; a housing having an inlet and a outlet, an operating shaft journaled within said housing, means for damping limited rotation of said shaft about the longitudinal axis thereof, a sleeve member slidably received on said shaft, means for spring biasing said sleeve for rotation with respect to said shaft in a first predetermined direction, clutch means for connecting said shaft to said sleeve upon movement thereof in said first predetermined direction for damping movement of said sleeve, said clutch means decoupling said sleeve from said shaft upon movement of said sleeve in an opposite direction of rotation with respect to said shaft for causing undamped movement of said sleeve, a radially outwardly directed extension on said sleeve adapted to oscillate about the longitudinal axis of said shaft between first and second positions in response to road movements of vehicle, valve means interposed between said inlet and outlet having a first position to open communication between said inlet and outlet and a second position to close communication therebetween, means for operating said valve means in response to movement of said sleeve member and for returning said valve means to its second position without delay when said sleeve is moved in said opposite direction without damping.

5. A valve assembly for controlling fluid flow between a high-pressure source and a low-pressure source comprising; a housing having an inlet and an outlet, an operating shaft journaled within said housing, means for damping limited rotation of said shaft about the longitudinal axis thereof, a sleeve member slidably received on said shaft, means for spring biasing said sleeve for rotation with respect to said shaft in a first predetermined direction, clutch means for connecting said shaft to said sleeve upon movement thereof in said first predetermined direction for damping movement of said sleeve, said clutch means decoupling said sleeve from said shaft upon movement of said sleeve in an opposite direction of rotation with respect to said shaft for causing undamped movement of said sleeve, a radially outwardly directed extension on said sleeve adapted to oscillate about the longitudinal axis of said shaft between first and second positions, a housing bore, a cam surface on said sleeve, a follower element slidably supported within said bore and having a segment thereon in engagement with said cam surface so as to produce reciprocal movement of said follower within said bore in response to oscillatory movement of said sleeve, hollow carriage member supported within said bore in spaced relationship to said follower element, a piston slidably reciprocably received within said carriage having an end surface thereon directly exposed to pressure at said housing inlet, a valve carried by said piston for movement therewith including a seat and a closure element normally closed when said sleeve extension is in its second position, means for coupling said follower to said valve to open said valve closure element following a predetermined movement of said sleeve in said first predetermined direction to communicate said inlet and outlet ports of said housing when said sleeve extension is in its first position, a relief valve spring biasing said piston into engagement with said carriage member when said sleeve extension is in its first position, a valve operator fixedly secured in said bore in spaced relationship to said valve when said piston is so biased against said carriage member, said piston being responsive to a predetermined pressure buildup when said sleeve extension is in its second position to shift against said relief valve spring to move said valve into engagement with said valve operator to relieve a predetermined pressure buildup at said inlet and allow flow of fluid therefrom to said outlet.

6. A valve assembly for controlling fluid flow between a high-pressure source and a low-pressure source comprising; a housing having an inlet and an outlet, an operating shaft journaled within said housing, a sleeve member slidably received on said shaft, means for spring biasing said sleeve for rotation with respect to said shaft in a first predetermined direction, clutch means for connecting said shaft to said sleeve upon movement thereof in said first predetermined direction for damping movement of said sleeve, said clutch means decoupling said sleeve from said shaft upon movement of said sleeve in an opposite direction of rotation with respect to said shaft for causing undamped movement of said sleeve, a radially outwardly directed extension on said sleeve adapted to oscillate about the longitudinal axis of said shaft between first and second positions, a housing bore, a cam surface on said sleeve, a follower element slidably supported within said bore and having a segment thereon in engagement with said cam surface so as to produce reciprocal movement of said follower element within said bore in response to oscillatory movement of said sleeve, hollow carriage member supported within said bore in spaced relationship to said follower element, means for adjustably positioning said carriage with respect to said housing bore and fixedly securing it in one of a plurality of adjusted positions, a stop shoulder on one end of said carriage defining an opening interiorly thereof, a piston slidably reciprocably received within said carriage having an end surface thereon directly exposed to pressure at said housing inlet, a valve carried by said piston for movement therewith including a seat and a closure element normally closed when said sleeve extension is in its second position, means for coupling said follower to said valve to open said valve closure element following a predetermined movement of said sleeve in said first predetermined direction to communicate said inlet and outlet ports of said housing when said sleeve extension is in its first position, a relief valve spring biasing said piston into engagement with said shoulder when said sleeve extension is in its first position, a valve operator fixedly secured in said bore in spaced relationship to said valve when said piston is so biased against said shoulder, said piston being responsive to a predetermined pressure buildup when said sleeve extension is in its second position to shift against said relief valve spring to move said valve into engagement with said valve operator to relieve a predetermined pressure buildup at said inlet and allow flow of fluid therefrom to said outlet.

7. A height controller for regulating the pressure within a fluid spring component of a vehicle leveling system for maintaining a predetermined height relationship between the sprung and unsprung masses of the vehicle comprising; a housing having an inlet port and an outlet port, an oscillatable shaft located within said housing having one end thereof extending exteriorly of said housing, a damping element fixedly secured to said one end, means defining a fluid-filled chamber surrounding said damping element and cooperating therewith to produce a fluid damping of oscillatory movement of said shaft about its longitudinal axis, a sleeve element slidably received on said shaft for relative oscillating movement with respect thereto, a spring clutch element connected between said sleeve element and said shaft and operative upon a first predetermined angular movement of said sleeve element with respect to said shaft to directly couple said sleeve element to said shaft to be damped therewith during such movement, a finger on said sleeve extending exteriorly of said housing adapted to follow movement of at least one of the sprung and unsprung masses for detecting relative movement therebetween, a cam surface on the outer periphery of said sleeve, a bore through said housing in fluid communication with said inlet and outlet ports, a cam follower located within said bore for reciprocal movement therein in response to oscillations of said sleeve element about the longitudinal axis of said shaft, a first spring for biasing said cam follower into engagement with said cam surface, a cylindrical carriage located within said bore in spaced relationship to said cam follower, means for adjustably locating said carriage at a predetermined fixed axial relationship with respect to said reciprocal cam follower, a longitudinal bore through said carriage, a piston slidably reciprocably received within said carriage bore, a valve supported by said piston for movement therewith, said valve including a seat and a valve closure element, an elongated operator stem secured to said closure element having opposite ends thereon, said stem being arranged coaxially of said carriage bore and having one end thereof located within said bore and the opposite end thereof extending within said housing bore in the direction of said cam surface, a stop on said opposite end, a spring seat supported by said stop and movable with respect to said stem in a direction away from said cam follower, a second spring having one end thereof in engagement with said piston and the opposite end thereof supported by said seat, said second spring holding said seat against said cam follower to cause said cam follower to open said valve for fluid flow therethrough when said cam surface is shifted to permit movement of said cam follower outwardly of said housing bore during an exhaust phase of operation, a valve operating plug fixedly secured within said carriage bore for selectively engaging said one end of said stem, a relief valve spring within said carriage bore for maintaining a predetermined force on said piston to prevent movement of said piston and said valve toward said valve operating plug, said one end of said stem being located between said piston and said operating plug and engageable therewith when a predetermined pressure is imposed on said piston to cause it to shift inwardly of said carriage bore against the force of said relief valve spring to open said valve and thereby connect said inlet and outlet ports during a relief phase of valve operation.

8. In the combination of claim 5, said means for adjustably positioning said carriage including a side opening in said housing, a plug seated within said side opening for limited relative rotation therein, means for sealing between said plug and said housing, said plug including a flange located exteriorly of said housing and in engagement therewith to prevent axially inward movement of said plug with respect to said housing opening, a slotted head on said plug located axially outwardly of said flange, an extension on the opposite end of said plug located eccentrically of the longitudinal axis of said plug, a slot in the side of said carriage member receiving said extension whereby upon rotation of said plug within said housing opening said cylinder is reciprocated with respect to said housing bore, and means for locking said flange against rotation with respect to said housing when the cylindrical carriage member is in its adjusted position.